(12) United States Patent
Johnson et al.

(10) Patent No.: US 7,294,654 B2
(45) Date of Patent: Nov. 13, 2007

(54) METHOD OF MAKING THERMALLY REGENERABLE SALT SORBENT RESINS

(75) Inventors: Roger E. Johnson, Reno, NV (US); Gerald Colombo, Myrtle Creek, OR (US)

(73) Assignee: Novation Environmental Technologies, Inc., Sparks, NV (US)

( * ) Notice: Subject to any disclaimer, the term of this patent is extended or adjusted under 35 U.S.C. 154(b) by 325 days.

(21) Appl. No.: 11/094,089

(22) Filed: Mar. 29, 2005

(65) Prior Publication Data

US 2005/0234141 A1    Oct. 20, 2005

Related U.S. Application Data

(63) Continuation-in-part of application No. 10/856,119, filed on May 28, 2004, now abandoned.

(60) Provisional application No. 60/563,891, filed on Apr. 19, 2004.

(51) Int. Cl.
*C08F 14/00* (2006.01)
*C08F 12/36* (2006.01)
*C08J 5/20* (2006.01)

(52) U.S. Cl. .............................. 521/26; 521/31; 521/38; 521/53; 521/131; 521/140; 525/83; 525/85; 525/332.2

(58) Field of Classification Search ................. 521/26, 521/31, 38, 53, 131, 140; 525/83, 85, 332.2
See application file for complete search history.

(56) References Cited

U.S. PATENT DOCUMENTS

| | | |
|---|---|---|
| 3,275,548 A | 9/1966 | Walters |
| 3,357,158 A | 12/1967 | Hollis |
| 3,991,017 A | 11/1976 | Barrett et al. ............. 260/1.2 R |
| 4,087,357 A | 5/1978 | Barrett et al. .................. 210/32 |
| 4,136,067 A | 1/1979 | Reed et al. .................... 521/32 |
| 4,152,496 A | 5/1979 | Barrett et al. ................ 531/139 |
| 4,184,948 A | 1/1980 | Dabby et al. .................. 210/25 |
| 4,202,737 A | 5/1980 | Shimizu ....................... 210/32 |

OTHER PUBLICATIONS

Hsu, Tah-Ben et al., "Salt Removal from Water by Continuous Ion Exchange Using Thermal Regeneration", *Ind. Eng. Chem. Res.*, 1989, 28, 1345-1351.

Rice, Richard G., "Continuous Desalination Using Cyclic Mass Transfer on Bifunctional Resins", *Ind. Eng. Chem. Fundam.*, 1981, 20, 150-155.

*Primary Examiner*—James J. Seidleck
*Assistant Examiner*—Olga Asinovsky
(74) *Attorney, Agent, or Firm*—Kirkpatrick & Lockhart; Preston Gates Ellis LLP

(57) ABSTRACT

A heterogenous hybrid thermally regenerable salt sorbent resin is formed from a hybrid precursor resin. The hybrid precursor resin is formed by intimately mixing a dry, solid crosslinked macroporous copolymer with a solution containing a polyunsaturated monomer, a monoethylenically unsaturated monomer containing a haloalkyl group and a polymerization initiator, followed by heating to cause polymerization. The hybrid precursor resin is then treated with a weak base, then subjected to hydrolysis conditions to form, respectively, weak base groups and weak acid groups to produce the hybrid thermally regenerable salt sorbent resin.

12 Claims, 3 Drawing Sheets

METHOD OF MAKING THERMALLY REGENERABLE SALT SORBENT RESINS

PRIORITY OF RELATED APPLICATIONS

This is a continuation-in-part of application Ser. No. 10/856,119, filed May 28, 2004, now abandoned the priority of which is claimed under 35 USC 120. The benefit of the provisional application Ser. No. 60/563,891, filed Apr. 19, 2004 pursuant to 35 USC 119(e) is hereby claimed. The disclosures of said applications are hereby incorporated by reference herein in their entirety.

The invention pertains to a method of preparing a hybrid thermally regenerable salt sorbent (TRSS) resin useful for removing or reducing the concentration of dissolved salts contained in an aqueous fluid.

BACKGROUND OF THE INVENTION

The invention relates to hybrid resins that constitute a system of discrete weak acid and weak base resin particles. The hybrid resins comprise a macroporous copolymer, termed the "host", which is at least partially filled in its macropores with a cross-linked copolymer of a different nature, termed the "guest". Thus there is a location of one type of polymer in the pores and another type of polymer in the framework of the hybrid resin.

The term "hybrid" indicates that the resins have some of the characteristics or properties of both a gel and a macroporous copolymer, but also that they have distinct properties of their own. The pores of the macroporous host copolymer may be filled with the guest copolymer utilizing varying percentages of crosslinking agent by introducing the guest copolymer or the guest copolymer-forming monomer components in varying amounts. The resins may also be prepared by filling the pores of the macroporous host copolymer with additional macroreticular copolymers in varying amounts with varying crosslinker contents or varying amounts of phase extender.

The host copolymer possesses a porous structure referred to as macroporous, which means it possesses a network of microscopic channels extended through the mass. While small, these channels are large in comparison with pores in a gel that are not visible, for example, in electronic photomicrographs. A typical macroporous (MP) copolymer has a surface area of at least about 1 $m^2$/gm and pores larger than about 50-20 Å. Usually the MP copolymers are produced in bead form having a particle size of around 10-900 microns. Similar types of monomeric materials are used in preparing the MP host copolymer and the guest copolymer, but the preparation process is varied to impart different characteristics such as porosity to the different phases of the hybrid resins.

As used herein, the term "elution" refers to the removal of ions, both cations and anions, which have been loaded onto the resin during the absorption process. The term "regeneration" refers to restoration of the functional groups to the resin to the zwitterion form. These operations are each thermally activated and essentially simultaneously occur. Therefore, elution will necessarily also involve regeneration.

SUMMARY OF THE INVENTION

A hybrid thermally regenerable salt sorbent (TRSS) resin is formed from a hybrid precursor hybrid resin having two relatively independent phases. The hybrid precursor resin is formed by (a) intimately mixing at a temperature less than about 40° C. (i) a nonaqueous solution of a polyunsaturated monomer, a monoethylenically unsaturated monomer containing a haloalkyl group and a polymerization initiation reagent with (ii) a dry, solid host crosslinked macroporous copolymer to imbibe the nonaqueous solution into the macroporous copolymer; wherein the host macroporous copolymer is formed from a polyunsaturated monomer and a monoethylenically unsaturated monomer containing a functionality convertible to a weak acid group; and (b) heating the mixture formed in step (a) within the temperature range of about 70° C. to 100° C. for a period of time sufficient to polymerize the polyunsaturated monomer with the monoethylenically unsaturated monomer containing a haloalkyl group to thereby form the hybrid precursor resin.

The host macroporous copolymer is formed from a polyunsaturated monomer and a monoethylenically unsaturated monomer containing a functionality convertible to a weak acid group.

The precursor resin formed is a hybrid copolymer containing a crosslinked macroporous host copolymer phase containing functionalities convertible to weak acid groups, having at least some of the pores filled with a crosslinked guest copolymer phase containing haloalkyl groups. The hybrid precursor resin is then formed into the hybrid TRSS resin by treatment with a weak base to at least partially convert the haloalkyl groups to weak base groups to form a heterogenous hybrid weak base resin; and treating the heterogenous hybrid weak base resin with a hydrolyzing agent to thereby at least partially convert the functionalities to weak acid groups to form a heterogenous hybrid TRSS resin having two relatively independent phases. One phase comprises the host crosslinked macroporous copolymer having weak acid groups and the other phase comprises the crosslinked guest copolymer having weak base groups.

The TRSS resins are useful for deionizing aqueous fluids, desalination, water purification, water softening, metals recovery and other applications requiring removal of ions from an aqueous source.

BRIEF DESCRIPTION OF THE FIGURES

In the accompanying FIG. 1, there is shown a diagram of a preferred synthetic method for producing the TRSS resins.

DETAILED DESCRIPTION OF THE PREFERRED EMBODIMENTS

Figure 1:
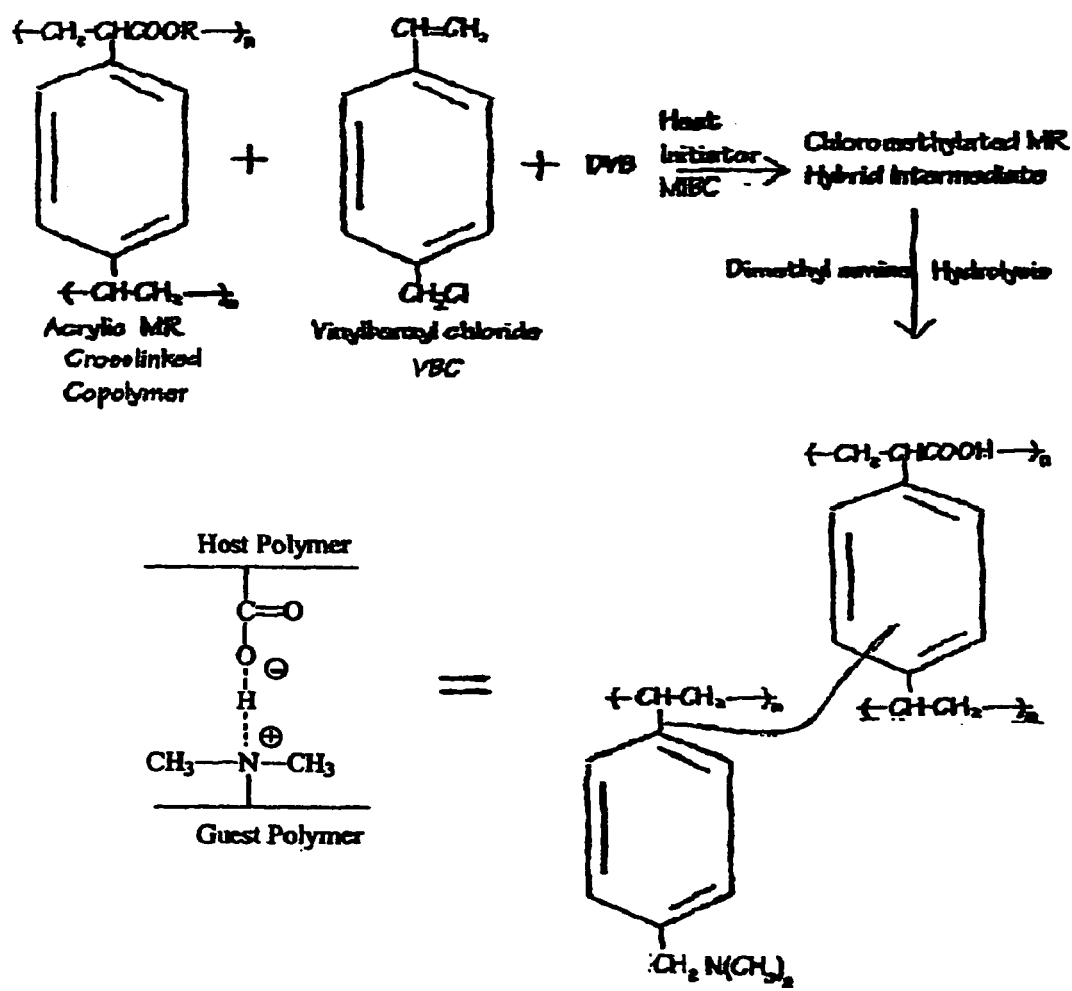

A hybrid precursor copolymer is formed according to the present invention by intimately mixing a host crosslinked macroporous copolymer with a nonaqueous solution of a polyunsaturated monomer, a monoethylenically unsaturated monomer containing a haloalkyl group and a polymerization initiator, followed by heating to cause polymerization to form the guest copolymer. The polyunsaturated monomer used to form the guest copolymer is selected from the same group of polyunsaturated monomers disclosed below which may be used to form the host macroporous copolymer.

The monoethylenically unsaturated monomers used to form the guest copolymer contain a haloalkyl group that can be treated to convert the haloalkyl group to a weak basic group. Such haloalkyl groups include, but are not limited to, chloromethyl and/or bromomethyl. The groups will be attached to the monoethylenically unsaturated portion of the monomer, as in for example, p-vinyl benzyl chloride (VBC). Thus, for example, the crosslinked guest precursor copolymer may be formed by polymerization of VBC and divinylbenzene, as the polyunsaturated monomer, to form a guest precursor copolymer having pendant chloromethyl groups.

Methods for preparing the host macroporous copolymer are known in the art. See for example U.S. Pat. Nos. 3,275,548 and 3,357,158, which are incorporated by reference herein.

The backbone of the host macroporous copolymer will be a crosslinked copolymer of (1) a polyunsaturated monomer containing a plurality of non-conjugated ethylenic groups ($CH_2=C-$) and (2) a monoethylenically unsaturated monomer, either aromatic or aliphatic, containing a functionality convertible to a weak acid group.

Suitable polyunsaturated monomers include divinylbenzene, divinyltoluenes, divinylnaphthalenes, diallyl phthalate, ethylene glycol diacrylate, ethylene glycol dimethacrylate, trimethylolpropane trimethacrylate, neopentyl glycol dimethacrylate, bis-phenol A dimethacrylate, pentaerythritol, tetra- and trimethacrylates, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polylallyl and polyvinyl ethers of glycol glycerol, pentaerythritol, resorcinol and the monothio- or dithio-derivatives of glycols.

A preferred polyunsaturated monomer is divinylbenzene (DVB).

Suitable monoethylenically unsaturated monomers containing a group convertible to a weak acid for the macroporous host copolymer include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m-, and p-methyl styrenes, and o-, m-, and p-ethyl styrenes, dimethyl itaconate, vinyl naphthalene, vinyl toluene and vinylnaphthalene. A class of monomers of particular interest consists of the esters of acrylic and methacrylic acid with $C_1$-$C_{10}$ aliphatic alcohol.

The formation of the macroporous crosslinked host copolymer will result in a precursor copolymer that will contain pendant functionalities that can be converted to weak acids. For example, referring to FIG. 1, if an ester of acrylic acid is used as the monoethylenically unsaturated monomer, the resultant host precursor copolymer will contain carboxylic acid ester groups which can later be converted to carboxylic acid groups by hydrolysis.

Methods for preparing the host macroporous copolymer are known in the art. See for example U.S. Pat. Nos. 3,275,548 and 3,357,158. Typically, the hybrid resin useful in the process of the present invention in which the pores of the macroporous host copolymer are filled with a crosslinked guest copolymer may be prepared by a "wet" process by adding a monomer mixture containing the components necessary to form the crosslinked guest precursor copolymer to a suspension of the host macroporous precursor copolymer in water. While not intending to be bound by a particular theory, it is believed that the monomers are adsorbed or imbibed into the pores of the. macroporous copolymer and the imbibed monomers are polymerized within the macroporous host copolymer beads by heating the mixture.

The hybrid resin useful in the process of the present invention in which the pores of the macroporous host copolymer are filled with a crosslinked guest copolymer may be prepared by a novel "dry" process by adding a nonaqueous solution of a monomer mixture containing the components necessary to form the crosslinked guest precursor copolymer and a polymerization initiator to the dry, solid host macroporous precursor copolymer. While not intending to be bound by a particular theory, it is believed that the monomers are adsorbed or imbibed into the pores of the macroporous copolymer. The imbibed monomers may then be polymerized within the macroporous host copolymer by heating.

A solution of the monomers necessary to form the crosslinked guest precursor and a polymerization initiator is added to and intimately mixed with solid, dry host macroporous precursor copolymer to imbibe the solution into the host precursor copolymer. Typical free radical initiators maybe used, such as peroxides. An organic acid peroxide is preferred, such as benzoyl peroxide. The solution is preferably non-aqueous, using solvents such as alcohols. Methyl isobutyl carbinol is preferred. Sufficient volume of solvent is used to dissolve the monomers and initiator, but not enough to form a solution or suspension of the dry, solid host precursor copolymer. Thus, although a solution is added to the solid host precursor polymer, the mixture remains as particulate solids throughout the addition and mixing process, so it is termed a "dry" process. The temperature during the addition and mixing of the solution of monomers with the host precursor copolymer will be less than about 40° C., typically about room temperature, to prevent premature initiation of the polymerization reaction while imbibing the monomers into the host precursor copolymer.

The imbibing step typically takes at least about 30 minutes of intimate mixing of the dry mixture and monomer solution. But mixing may be continued for from 2 to 12 hours or more to achieve thorough inclusion of the monomers into the macropores of the host precursor copolymer. The dry mixture may then be stored cold or processed for polymerization.

Polymerization is performed by agitation while heating at a temperature in the range of about 70° C. to 100° C. A typical temperature range is about 80° C. to 90° C. Agitation is preferred for an even distribution of heat throughout the solids. Heating is continued to complete the polymerization reaction, typically from 2 to 5 hours.

After the polymerization following the imbibing process, the ion functional groups are introduced to create the internal zwitterion relationship. Referring to the FIG. 1, this may be done by treating the hybrid resin with a weak base such as dialkyl amine to convert the haloalkyl groups to amine groups, and by hydrolysis to convert the preferred carboxylic ester groups, or other protected weak acid functionalities on the host precursor copolymer, to weak acid groups.

The TRSS resins are particulates and contain both weakly acidic groups and weakly basic groups within a resin matrix. The resins are hybrid resins in the form of beads which have as a macroporous matrix a host copolymer formed of a polyunsaturated monomer and a monoethylenically unsaturated monomer containing weak acid groups with the macropores in the matrix being at least partially filled with a crosslinked guest copolymer. The guest copolymer is a copolymer of a polyunsaturated monomer and a monoethylenically unsaturated monomer containing weak basic groups.

Since the guest copolymer is held within the pores of the host copolymer, the respective weak base and weak acid groups are in proximity and they thus can form internal zwitterions. When loaded with a salt comprising a cation and an anion, the cation and anion of the salt associate with the respective weak base and weak acid groups, thus, replacing the interaction of the zwitterions. Since no external ion exchange takes place, thermal removal of the adsorbed salt may be accomplished at relatively moderate temperatures, typically in the range of about 60-100° C.

The formation of the crosslinked guest precursor copolymer in the presence of the macroporous host precursor copolymer is a polymerization generally carried out in the presence of a polymerization initiator. Suitable initiators include those which provide free radicals to function as reaction initiators include benzoylperoxide, t-butyl hydroperoxide, lauroyl peroxide, cumene hydroperoxide, tetralin peroxide, acetyl peroxide, caproyl peroxide, t-butyl perbenzoate, t-butyl diperphthalate, methyl ethyl ketone peroxide.

The amount of peroxide initiator required is roughly proportional to the concentration of the mixture of monomers. The usual range is 0.01% to 5% by weight of catalyst with reference to the weight of the monomer mixture. The optimum amount of catalyst is determined in large part by the nature of the particular monomers selected, including the nature of the impurities that may accompany the monomers.

Another suitable class of free-radical generating compounds which can be used as initiators includes the azo compounds, including for example, azodiisobutyronitrile, azodiisobutyramide, azobis($\alpha,\alpha$-dimethylvaleronitrile), azobis($\alpha$-methyl-butyronitrile), dimethyl, diethyl, or dibutyl azobis(methyl-valerate). These and other similar azo compounds, which serve as free radical initiators, contain an —N=N— group attached to aliphatic carbon atoms, at least one of which is tertiary. An amount of 0.01 to 2% of the weight of monomer or monomers is usually sufficient.

The nonaqueous solvent used to from the solution the monomer mixture imbibed into the host macroporous copolymer precursor also serves as a precipitant for the formed guest precursor copolymer. The solvent must also be chemically inert under the polymerization conditions. The presence of the precipitant causes a phase separation of the product hybrid copolymer. The determination and selection of such precipitants are known in the art.

The relative amounts of guest precursor polymer and macroporous (MP) host precursor copolymer can be varied over a wide range. It is desirable, however, to use at least 50 parts by weight of guest precursor copolymer per 100 parts by weight of MP base or host precursor polymer, with the maximum amount being dictated by that amount which can be imbibed or retained in or on the MP structure. This maximum will ordinarily be about 300 parts by weight of guest precursor copolymer per 100 parts by weight of base precursor polymer, although higher amounts can also be used. Preferably, the amounts of guest precursor copolymer to MP base will be in the range of about 100 to 200 parts of guest precursor copolymer per 100 parts of MP polymer.

The TRSS resin may be used to remove the salts from an aqueous solution. Thus the hybrid resins have use for deionizing water, desalination, desalting urine to a level where it may be used directly as a hydrogen source for plants, purification for water regeneration on space vehicles, decolorizing sugar solutions, and decontaminating or purifying industrial waste water.

The TRSS resins will be contacted with the liquid containing the salts to be removed at temperature range, typically from about 5° C. to 25° C. To regenerate the TRSS resin, that is, to remove the cations and anions associated with the adsorbed salt from the resin, the resin will be contacted with or flushed with an aqueous liquid at a higher temperature, typically in the range of about 60-100° C.

It is a further advantage of the present invention, and which is unexpected, that capacities of the resins of the invention are improved over similar host-guest hybrid resins known in the art.

The following examples will further illustrate the invention but are not intended to limit it. In the present application, parts and percentages are given by weight unless otherwise stated.

EXAMPLE 1

Resins according to the invention may also be made as follows:
1. Mix 110 g VBC, 46 g methyl isobutylcarbinol, 8.4 g 55% DVB and 11 g benzoylperoxide for 15 minutes to dissolve the peroxide.
2. Add the mixture from step 1 to 100 g XE-275 (Rohm & Haas; a crosslinked macroporous copolymer formed from an acrylic ester and divinyl benzene) in a rolling container and imbibe for a minimum of 3 hrs.
3. Heat the rolling container for a minimum of 1.5 hrs. at 80° C. to polymerize.
4. Transfer to 3-neck flask after passing through 16-mesh sieve.
5. Add 800 ml 1N NaOH and 850 ml 40% dimethylamine.
6. Heat to boiling and reflux 1.5 hr. (about 75° C.).
7. Pour off solution and add fresh 850 ml 1N NaOH and heat at 90° C. for 1.5 hr.
8. Pour off liquid and rinse resin with deionized water to conductivity of 200.
9. Acidify with 1N HCl by adding acid at such a rate that pH does not go below 4 until a stable (for 1 hr) end point of pH 5.30 is reached. This normally takes several hours and about 550 ml 1N HCl.

Yield: about 500 ml finished resin.

EXAMPLE 2

Resins according to the present invention were compared to a commercial thermally regenerable resin AG MP-1 made by Bio-Rad (sold commercially as AG-11 A8) and a known thermally regenerable resin, identified as GR-40 (commercial name XD-5). The resin GR-40 and the resins according to the present invention tested below all use the same macroporous host copolymer, XE275 (Rohm and Haas) which is formed by polymerization of an acrylic ester with divinyl benzene under conditions which form a macroporous crosslinked copolymer. The following steps were used to form a resin according to the present invention identified as resin 23 AHH:
1. Stir mixture of 10 g Rohm and Haas copolymer XE-275 (host polymer) in 50 cc water and 1 g Igepon-42 surfactant
2. Make mixture of 10 g vinylbenzyl chloride monomer, 0.7 g of 55% divinylbenzene, 4.3 g methyl isobutyl carbinol, and 1 g benzoyl peroxide (guest monomer mixture).
3. Add mixture from (2) dropwise to stirred polymer slurry from (1) to imbibe (2) into (1)
4. Heat to 80 C. to polymerize mixture (2) inside the XE-275 beads
5. Pour off liquid and add 155 ml 40% dimethyl amine
6. Heat to 45 C. to aminate chloride groups on vinyl benzene
7. Pour off liquid and add 20 ml water and 20 ml 1N KOH
8. Heat at 95 C. for 1 hour to hydrolyze alcohol groups on XE-275 polymer
9. Pour off liquid and rinse to conductivity of approximately 25 µS
10. Titrate with continuous stirring, using 1N HCl to pH approximately 5.3
11. Regenerate in boiling water to conductivity of ca. 250 µS when hot, ca. 20 µS at room temperature Other resins according to the present invention, 36A and 27D were made with the modifications as indicated below. Each of the resins was tested in 40 cc batches. Breakthrough curves were generated using a 500 mg/L sodium chloride solution, which is close to the high salt content of composite potable water. The flow rates used in the tests were identical in each case, and the minutes to breakthrough of the salt (determined when 5 to 10 ppm was detected in the effluent). Similarly, the time to 50% breakthrough, defined as detection of the salt in the effluent at 250 ppm . The results are given in the table below.

| Sample | Min. to BT[1] | Min to 50% BT[2] |
|---|---|---|
| Bio-Rad[3] | 2.5 | 4 |
| GR 40[4] | 4 | 36 |
| 23 AHH[5] | 72 | 150 |
| 36A[6] | 84 | 154 |
| 27 B[7] | 108 | 153 |

[1]Breakthrough of salt, ie 5-10 ppm
[2]Breakthrough of salt at 250 ppm
[3]Commercial resin
[4]A known resin composed of XE-275 host copolymer; guest monomer mix:styrene, divinyl benzene, methyl isobutyl carbinol; guest monomer mix host polymer ratio = 1:1.
[5]Guest monomer mix:host polymer ratio = 1:1. See procedure below, Example 3.
[6]Same as 23 AHH except that DVB in monomer mix reduced by 50%.
[7]Same as 23 AHH except that MIBC in monomer mix reduced by 50%.

As can be seen from the table, the resins according to the present invention exhibit a substantial salt removal capacity.

EXAMPLE 3

To an 8 gallon drum was added 4.72 kg of host polymer XE-275. In a separate container, divinylbenzene (397 g) and benzoyl peroxide (52 g) were mixed in 2171 g methyl isobutyl carbinol then added to vinylbenzyl chloride (5188 g) in a larger flask and mixed until homogeneous. The entire mixture was then added to the drum containing XE-275 and the drum was rolled for 6 hours at room temperature. The rolling ceased and the mixture was stored overnight in a cold room. The drum was rolled an additional three hours before a sample was taken for the polymerization reaction. To a rotary flask accommodating a solvent extractor and heated by a water bath, 2.5 kg of the imbibed mixture was added. The rotating flask was heated to about 83° C. and rotated for 3¾ hours. The sample was washed with methanol to remove residual monomer. Four more batches (2.5 kg each) of the imbibed mixture were similarly treated (heated at 85° C. for 4¼ hrs). The products of the 5 batches were screened through a 4 mesh screen. After removal of chaff (454 g), the hybrid copolymer was recovered (87% yield).

EXAMPLE 4

The hybrid copolymer from Example 3 (5.3 kg) was charged to a flask accommodating a reflux condenser, stirrer and a water bath. With the water bath at 10° C. 50% NaOH (2 kg) was added with about 500 ml deionized water to form a slurry. The temperature in the flask rose to 28° C. When it dropped to 23° C. dimethylamine (40%; 4500 ml; 4000 g) was added dropwise at a rate varying from 10 to 20 m/min while maintaining the temperature in the flask in the range of 21°-25° C. After 2.5 L were added over about 2½ hrs, the exotherm in the flask ceased. The amine addition was completed after to total of 3¾ hrs. The final temperature in the flask was 24° C. The resin in the flask was yellow-green. The reaction mixture was stirred overnight. The supernatant (containing excess amine) was removed and the resin was washed (3X ; 1 lit/wash) with deionized water. Then 2 L DI was added to make a slurry which was transferred to another flask for the hydrolysis reaction.

EXAMPLE 5

To the flask containing the resin slurry from Example 4 were added 1.5 L deionized water and 2.5 kg 50% NaOH. The flask was gradually heated until a distillate was produced coming off at 68° C. The temperature of the distillate gradually rose over about the next 2½ hrs to 90° C. The distillate temperature remained at 90° C. for about ½ hr, then a second phase began to appear in the distillate. The temperature of the distillate gradually rose to 94.5° C. after an hour. The hydrolysis was complete and the heating was stopped.

EXAMPLE 6

Resins of the prior art, such as GR40, are known to be too selective for calcium and magnesium ions in that regeneration with water at 95° C. is incomplete, thus rendering them commercially unacceptable. In contrast, a resin according to the invention, TRSS 36A, is less selective for calcium and magnesium ions, therefore, regeneration at 95° is more complete and yields reproducible loading/regeneration cycles that are commercially acceptable in industrial and residential softening applications. The main differences between these resins are shown in FIGS. 2 and 3.

Figure 2:
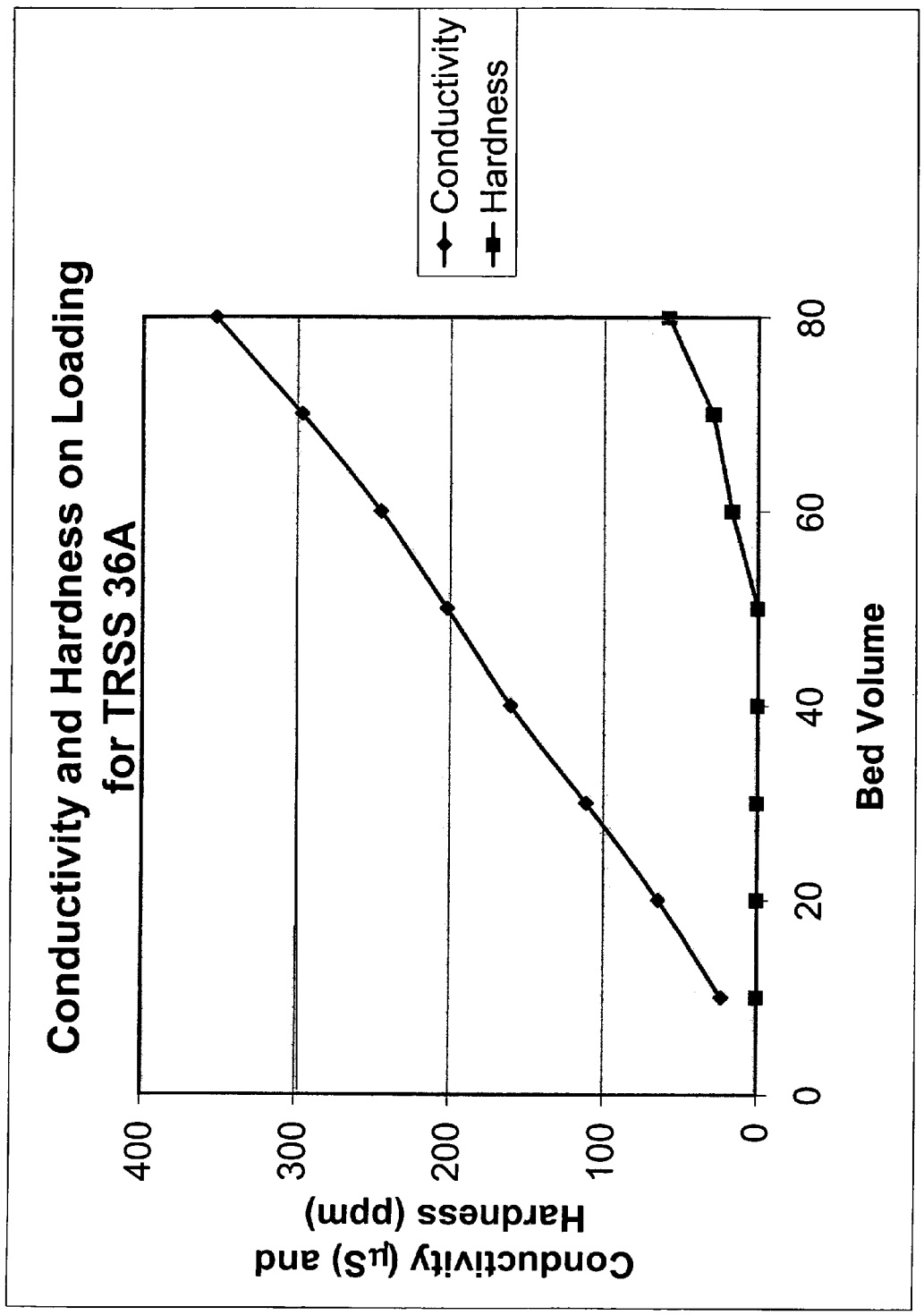
FIG. 2 is a graph of conductivity (a measure of total ion concentration) and hardness (a measure of calcium and magnesium ion concentration) vs. bed volume on loading a resin according to the invention, TRSS 36A.
Figure 3:
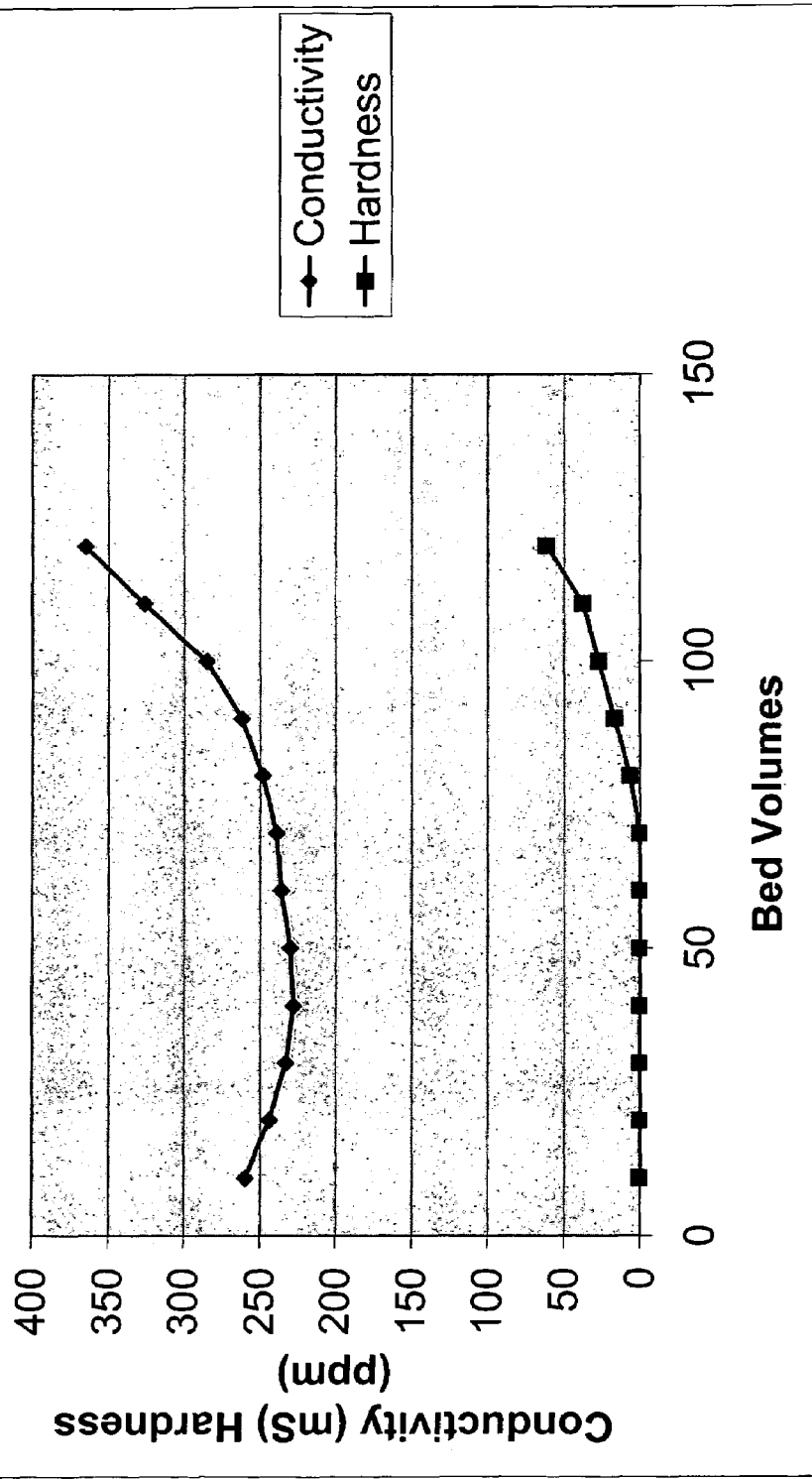
FIG. 3 is a graph of the same parameters as shown in FIG. 2 on loading a known resin, GR40.

Also, FIGS. 2 and 3 show that the prior art resin has virtually no capacity for sodium ions in the presence of calcium and magnesium ions compared to TRSS 36A which has significant sodium capacity in the presence of these ions. This data indicate that a resin according to the invention is more commercially viable than a prior art resin in desalting applications.

The invention claimed is:

1. The method forming a precursor for a heterogenous thermally regenerable salt sorbent having two relatively independent phases by polymerizing in the presence of a host macroporous copolymer a first polyunsaturated monomer and a monoethylenically unsaturated monomer containing a haloalkyl group to form a guest crosslinked copolymer, wherein said host macroporous copolymer is formed from a second polyunsaturated monomer and a monoethylenically unsaturated monomer containing a functionality convertible to a weak acid, comprising the steps of
   (a) intimately mixing at a temperature less than about 40° C. a nonaqueous solution of said first polyunsaturated monomer, said monoethylenically unsaturated monomer containing a haloalkcyl group and a polymerization initiation reagent with said macroporous copolymer as a solid to imbibe said solution into said solid macroporous copolymer; and
   (b) heating the mixture formed in step (a) within the temperature range of about 70° C. to 100° C. for a period of time sufficient to polymerize said monomers to thereby form said precursor.

2. The method according to claim 1 wherein said haloalkyl group comprises a chloroalkyl group.

3. The method according to claim 2 wherein said chloroalkyl group comprises a chloromethyl group.

4. The method according to claim 1 wherein said monoethylenically unsaturated monomer containing a functionality convertible to a weak acid comprises an acrylic ester.

5. The method according to claim 1 wherein said first and second polyunsaturated monomers comprise divinylbenzene.

6. The method according to claim 1 wherein said monoethylenically unsaturated monomer containing haloalkyl group comprises vinylbenzyl chloride.

7. A method according to claim 1 wherein said step (a) comprises (1) forming a solution of said polyunsaturated monomer and polymerization initiation reagent; (2) adding said unsaturated monomer containing a haloalkyl group to said solution from step (1); and (3) intimately mixing said solution from step (2) with said macroporous copolymer as a solid to imbibe said solution into said macroporous copolymer.

8. A method according to claim 1 wherein the mixing of step (a) is conducted for a period of at least 30 minutes.

9. The method according to claim 8 wherein said period of mixing is in the range of about 2 to 12 hours.

10. A method according to claim 1 wherein said polymerization agent comprises an organic acid peroxide.

11. A method according to claim 10 wherein said peroxide comprises benzoyl peroxide.

12. A method according to claim 1 wherein the temperature range in said step (b) is about 80° C. to 90° C.

* * * * *

UNITED STATES PATENT AND TRADEMARK OFFICE
CERTIFICATE OF CORRECTION

PATENT NO. : 7,294,654 B2
APPLICATION NO. : 11/094089
DATED : November 13, 2007
INVENTOR(S) : Roger E. Johnson and Gerald Colombo It is certified that error appears in the above-identified patent and that said Letters Patent is hereby corrected as shown below:

Column 8, line 23, delete "from 10 to 20 m/min" and insert --from 10 to 20 ml/min--.

Column 9, line 13, delete "C. a nonaqucous" and insert --C. a nonaqueous--.

Column 9, line 15, delete "haloalkcyl" and insert --haloalkyl--.

Signed and Sealed this

Tenth Day of February, 2009

JOHN DOLL
*Acting Director of the United States Patent and Trademark Office*